United States Patent [19]

Sakaguchi et al.

[11] 4,000,501
[45] Dec. 28, 1976

[54] OPTICAL INSTRUMENT WITH A ZOOM LENS STRUCTURE

[75] Inventors: Keiichi Sakaguchi; Noritsugu Hirata, both of Yokohama, Japan

[73] Assignee: Canon Kabushiki Kaisha, Tokyo, Japan

[22] Filed: Feb. 24, 1975

[21] Appl. No.: 552,333

Related U.S. Application Data

[63] Continuation of Ser. No. 304,114, Nov. 6, 1972, abandoned.

[30] Foreign Application Priority Data

Nov. 13, 1971 Japan .............................. 46-90982
Nov. 13, 1971 Japan .............................. 46-90983
Nov. 13, 1971 Japan .............................. 46-90984
Dec. 13, 1971 Japan .............................. 46-100861

[52] U.S. Cl. .............................. 354/197; 350/255; 354/199

[51] Int. Cl.$^2$ ..................... G03B 3/02; G03B 13/00

[58] Field of Search .......... 354/196, 197, 198, 199, 354/201, 195, 155; 350/187, 255

[56] References Cited

UNITED STATES PATENTS

| 3,062,102 | 11/1962 | Martin | 354/155 |
| 3,095,750 | 7/1973 | Mahn | 350/187 X |
| 3,106,125 | 10/1963 | Martin et al. | 354/197 |
| 3,399,014 | 8/1968 | Butterfield et al. | 350/187 X |
| 3,538,832 | 11/1970 | Koeber, Jr. | 352/140 X |
| 3,550,518 | 12/1970 | Himmelsbach | 350/187 X |
| 3,590,713 | 7/1971 | Kirstein | 354/198 |
| 3,696,725 | 10/1972 | Lange | 350/255 |
| 3,718,076 | 2/1973 | Neda et al. | 354/37 |

FOREIGN PATENTS OR APPLICATIONS

381,079   10/1960   Switzerland ...................... 354/195

*Primary Examiner*—L. T. Hix
*Assistant Examiner*—E. M. O'Connor
*Attorney, Agent, or Firm*—William R. Woodward

[57] ABSTRACT

A zoom lens structure for use with an optical instrument comprises a zooming optical system movable along the optical axis thereof and including a magnifying system and a correcting system; support frames for holding the zooming optical system; a plurality of guide shafts fitted in the support frames of the zooming optical system to cause sliding of the support frames; a frame member for holding the guide shafts at the opposite ends thereof and surrounding the zooming optical system; a fucusing optical system; a holder frame for permitting the focusing optical system to be moved along the optical axis independently of the zooming optical system; and a mechanism using a cam to drive the holder frame. Within the frame member surrounding the zooming optical system, a beam splitter for splitting an object light beam to derive a viewfinder light beam is interposed between the portion of the frame member remote from an object to be photographed and the zooming system. The side wall of the frame member is formed with an opening for passing therethrough the viewfinder light beam. Thus, the lengths over which the zooming optical system holder frames and the guide shafts are fitted together can be increased to enhance the zooming accuracy.

14 Claims, 29 Drawing Figures

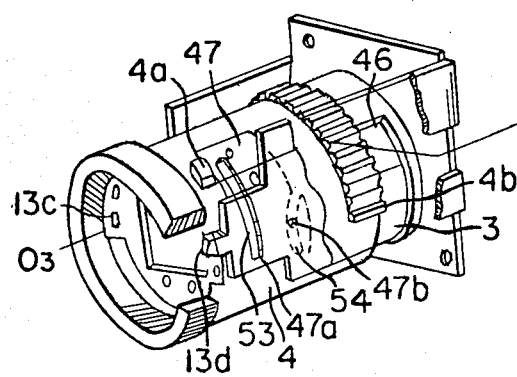
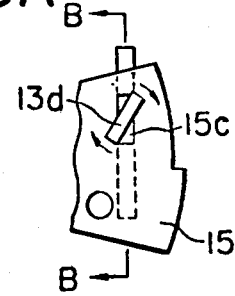
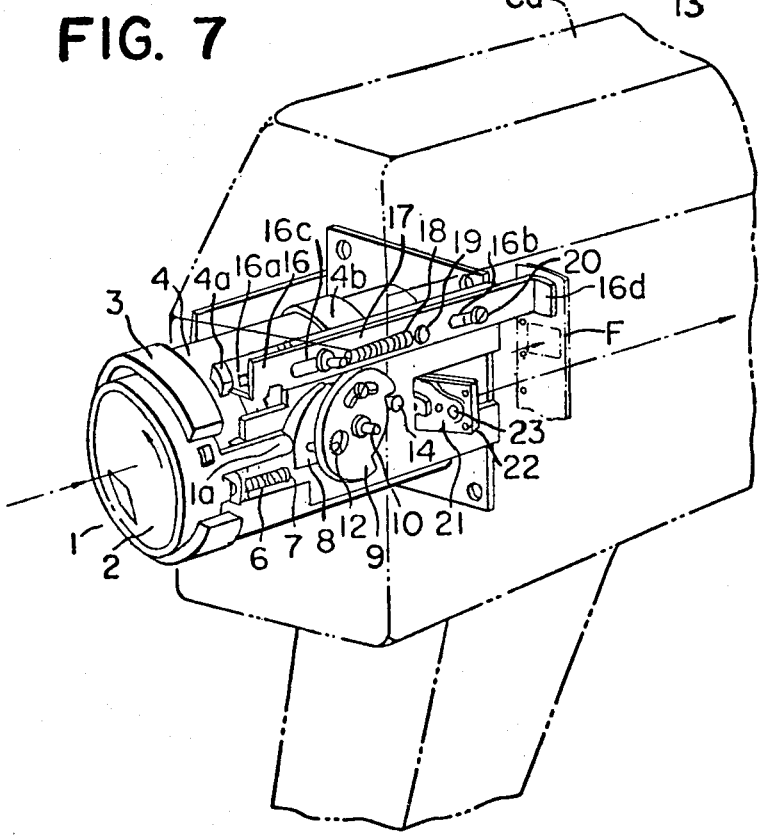

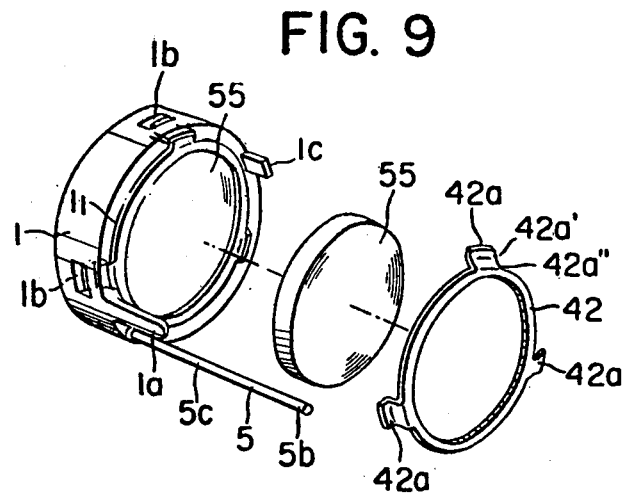
FIG. 9
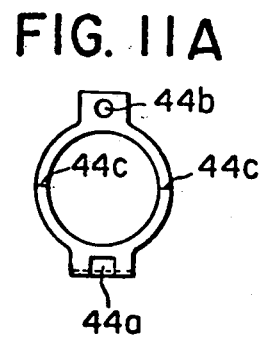
FIG. 11A
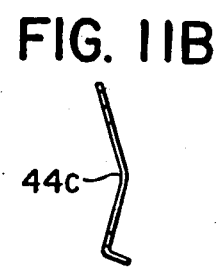
FIG. 11B
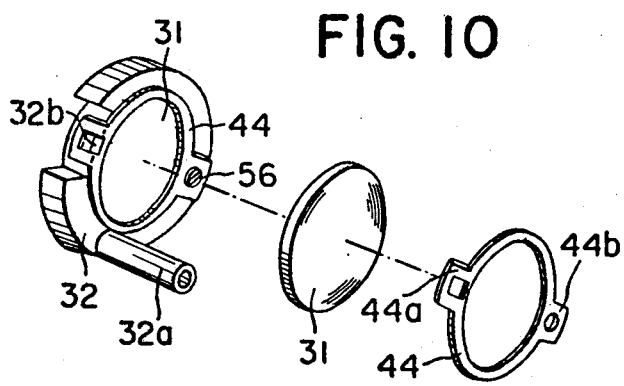
FIG. 10
FIG. 11C
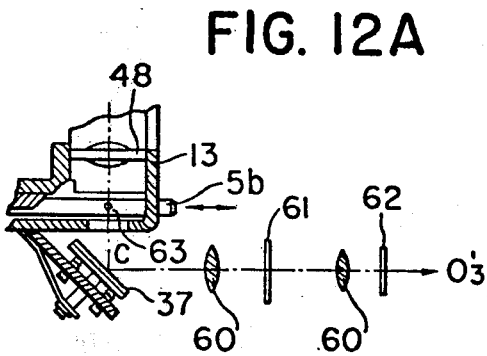
FIG. 12A
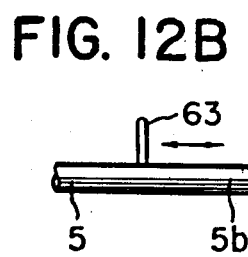
FIG. 12B

OPTICAL INSTRUMENT WITH A ZOOM LENS STRUCTURE

This is a continuation of application Ser. No. 304,114, filed Nov. 6, 1972, now abandoned.

BACKGROUND OF THE INVENTION

1. Field of the Invention

This invention relates to improvements in an optical instrument having a zoom lens structure provided with a plurality of guide shafts for axially guiding a zooming optical system including a magnifying system and a correcting system. More specifically, the invention relates to an optical instrument having a zoom lens structure wherein openings for passing an object light beam therethrough are formed centrally of a frame member holding the opposite ends of the guide shafts for guiding the axial movement of the zoom lens. A beam splitter for splitting the object light beam into a picture-taking light beam and a viewfinder light beam is provided between the zooming optical system and the rear end wall of the frame member, and an opening for allowing the viewfinder light beam to pass is formed in the side wall of the zoom lens structure.

2. Description of the Prior Art

In the zooming optical system of the prior art, a most popular zooming operation is that known as the mechanical compensation type zooming which comprises moving both the magnifying optical system and the correcting optical system along the optical axis while maintaining them in a predetermined relationship. To allow such zooming operation, members for carrying the magnifying and correcting systems are movably mounted on axial guide members, whose opposite ends are held by frame members. The members for carrying the two axially movable optical systems and the guide members are usually fitted one within another, and a zooming operation ring forming a part of the zoom lens structure may be operated to move the two optical systems axially along the guide members. In such zoom lens structure according to the prior art, the rear frame member is formed with an opening for passage of the object light beam. For the TTL photography, the light beam passed through such opening is split into a picture-taking light beam and a viewfinder light beam by a beam splitter provided exteriorly of the zoom lens structure. Thus, in the zoom lens structure of the prior art, means such as a beam splitter or mirror for providing a viewfinder light beam must be provided rearwardly of the structure. This in turn has given rise to the necessity of reducing the axial length of the zoom lens structure itself as much as possible to thereby reduce the length over which the zooming optical system is projected beyond the body of a motion picture camera or like optical instrument. As a result, the lengths over which the holder members for the two movable optical systems and the guide members are fitted together have been so much limited that sufficient fitting precision could not be obtained. Such inferior fitting precision has caused inclination of the lenses with respect to the optical axis, which in turn has resulted in a lower accuracy of image formation on the focal plane.

SUMMARY OF THE INVENTION

It is an object of the present invention to eliminate the above noted disadvantages existing in the zoom lens structure of the prior art and to provide an optical instrument having a zoom lens structure which affords an improved accuracy of image formation during zooming operation.

It is another object of the present invention to provide an optical instrument having a zoom lens structure which includes a plurality of axial guide members for magnifying and correcting systems and in which openings for passing therethrough an object light beam are formed centrally of frame members for holding the axial guide members at the opposite ends thereof, a beam spitter for splitting the object light beam into a picture-taking light beam and a viewfinder light beam is disposed between the zooming optical system and the rear one of the frame member, and an opening for passing therethrough a viewfinder light beam is formed in the side wall of the zoom lens structure.

It is still another object of the present invention to provide an optical instrument having a zoom lens structure of the described type in which a source of photographic information responsive to at least one of the magnifying and correcting systems is provided in the opening for the viewfinder light beam.

It is a further object of the present invention to provide an optical instrument having a zoom lens structure of the described type which further includes a cam member rotatably mounted to the body of the instrument, a follower member engageable with at least a portion of the cam member, and a focusing optical system axially movable with the follower member.

It is still a further object of the present invention to provide an optical instrument having a zoom lens structure of the described type which further includes a member for imparting range information corresponding to the amount of axial movement of the focusing optical system, said information imparting member being supported so that at least a portion thereof may appear substantialy in a focal plane in the viewfinder's optical path, and means responsive to the movement of the focusing optical system, thereby indicating the range information within the viewfinder of the instrument.

It is yet a further object of the present invention to provide an optical instrument having a zoom lens structure of the described type which further includes a lens holder frame, a resilient member engageable with a lens and attachable to the lens holder frame, the lens being normally fixed to the lens holder frame due to the resilient deformation of the resilient member.

BRIEF DESCRIPTION OF THE DRAWINGS

These and other objects and features of the present invention will become fully apparent from the following detailed description taken in conjunction with the accompanying drawings, in which:

FIG. 5 is a perspective view of the FIG. 3 zoom lens structure with the focusing lens removed to show the zooming operation ring;

FIG. 6A and 6B show the manner in which the front or the rear frame member and lens casing of the FIG. 3 zoom lens structure are assembled together, FIG. 6A being a fragmentary side view after the assemblage, and FIG. 6B being a fragmentary front view showing the inserted position of the frame member and lens casing prior to the assemblage:

FIG. 7 shows, in perspective view, the zoom lens structure of FIG. 3;

FIG. 9 is an exploded perspective view of the focusing lens unit in the zoom lens structure of FIG. 3;

FIG. 10 is an exploded perspective view of one zoom lens unit in the zoom lens structure of FIG. 3;

FIGS. 11A, 11B and 11C are a front view, a side view and a plan view, respectively, of a lens pressing resilient member;

FIG. 12A is a fragmentary detailed sectional view showing a rear end and side portion of the FIG. 3 zoom lens structure;

FIG. 12B is an enlarged front view of the guide member and range information imparting member shown in FIG. 12A;

DESCRIPTION OF THE PREFERRED EMBODIMENTS

Figure 1:
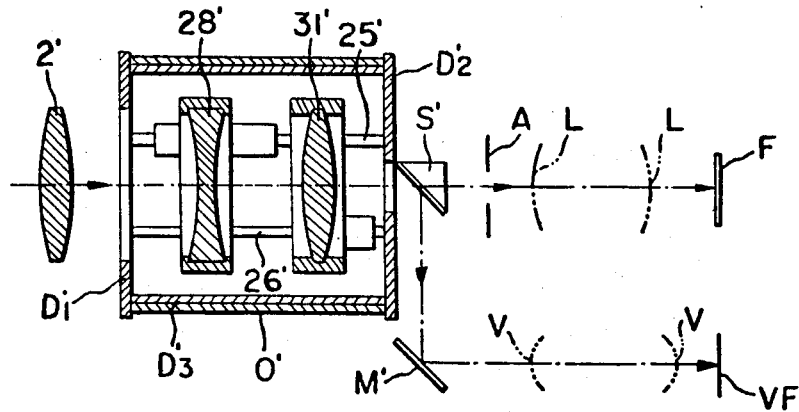
FIG. 1 is a longitudinal sectional view illustrating the construction of the zoom structure according to the prior art.

Referring to FIG. 1, it schematically shows a well-known zoom lens structure and includes a focusing system 2', a magnifying system 28', a correcting system 31', a beam splitter S', an image forming system L', and a sensitive medium such as film F. The figure further includes an aperture stop A for controlling an object light beam, a mirror M', a viewfinder's optical system V, and a viewfinder mask VF. The magnifying system 28' and correcting system 31' have their axial guide members 25' and 26' held at the opposite ends thereof by frame members D1' and D2', which in turn are held by a casing D3' to form a major part of the structure. Over the outer periphery of the casing D3' is rotatably mounted a zooming operation ring 0', which is provided with two different cams functioning to covert the rotational movement of the ring 0' into the axial movement of the magnifying and correcting systems 28' and 31'. Means responsive to these cams is connected to the magnifying system 28' and the correcting system 31' respectively, and the casing D3' is therefore formed with an opening for permitting movement of the cam-responsive means, although not shown.

Figure 2:
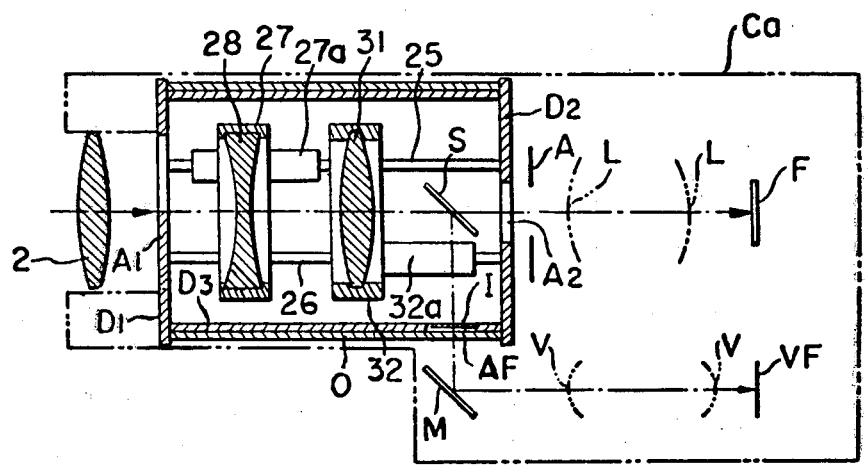
FIG. 2 is a longitudinal sectional view schematically illustrating the construction of an optical instrument having a zoom lens structure according to the present invention.

FIG. 2 schematically illustrates the zoom lens structure according to the present invention. This structure differs from that of FIG. 1 in that apertures A1 and A2 for passage of the object light beam are formed centrally of frame members D1 and D2 holding the opposite ends of axial guide members 25 and 26, that a beam splitter S for splitting the object light beam into a picture-taking light beam and a viewfinder light beam is disposed between a correcting system 31 and the rear frame member D2, and that an aperture AF for the viewfinder beam light is formed through the side wall of the zoom lens structure. A zooming operation ring 0 and a focusing system 2 are similar to those designated by 0' and 2' in FIG. 1.

The provision of the beam splitter S within the zoom lens casing lends itself to increase the spacing between the frame members D1 and D2 as compared with the prior art structure, and this also serves to simplify the construction of the camera Ca. The axial guide members 25 and 26 are longer than in the prior art, which in turn provides greater lengths of fitting or mating between the guide members 25, 26 and the portions 27a and 32a of the lens holder frames 27 and 32 holding the magnifying and correcting systems 28 and 31 within the zoom lens casing. In view of the fact that the respective optical systems 28 and 31 may be displaced along the optical axis while being supported by a plurality of guide members, the aforesaid greater lengths of fitting is effective to prevent the lenses from inclining with respect to the optical axis. Especially, this holds very much true with low-magnification zoom lens systems and is highly useful in practice. Furthermore, an information source I responsive to zooming operation may be provided in the aperture AF for the viewfinder light beam to thereby indicate the condition of zooming operation within the viewfinder field or in the vicinity thereof.

With the above-described objects of the present invention in view, a preferred embodiment of the present invention will further be described.

It has already been proposed that a zoom system which can. In addition to the zooming function known in the cinecameras of the prior art, impart the focusing function for super-closeups (i.e. macro function) to a portion of the magnifying lens group. Such system is similar to the present invention in that it requires a control cam for imparting a focus displacement correcting function during zooming, in addition to the zooming and macro functions. The present invention, however, may be said to have succeeded in minimizing the dimensions of the zooming optical system while enhancing the performance thereof by providing at least a portion of the correcting lens group with a macro function.

As a method of providing a macro function, it is known to displace a relay lens, but this encounters difficulties in making a macro operating mechanism for imparting a macro function integral with a zooming mechanism when the viewfinder's optical path and aperture mechanism are taken into consideration.

Various embodiments of the present invention will now be described in detail with reference to FIGS. 3 and so forth. First, the construction of the zoom lens structure will be particularly explained in conjunction with FIGS. 3 to 7.

A holder frame 1 holds therewithin a doublet 2 and a convex meniscus lens 55 which together constitute a focusing system. The lens 55 secured by a lens pressing resilient member 42 such as spring or the like, as shown in the sectional view of FIG. 3. A magnifying system lens 28 is shown to comprise three lenses 28a, 28b and 28c, of which the lenses 28a and 28b are in marginal contact. The magnifying system lens 28 is held by and within a holder frame 27 having a lens fixing retaining portion 27b engaged with a resilient member such as spring 43 for fixing the lens 28. A portion of the resilient member 43 is secured to the holder frame by means of screw 56. A correcting system lens 31 is held by and within a holder frame 32, which holds the lens 31 by means of resilient member 44 which in turn is retained by the retaining portion 32b of the holder frame 32 and secured to the frame 32 by means of screw 56.

Members 27a and 32a are formed integrally with the magnifying system holder frame 27 and the correcting system holder frame 32, respectively, and are fitted on guide members 25 and 26 attached to the lens structure frames 13 and 15, respectively. These members 27a and 32a, with a member fitted on a shaft 52 as shown in FIG. 4, support the magnifying and correcting lens units for sliding movement along the optical axis.

Figure 3:
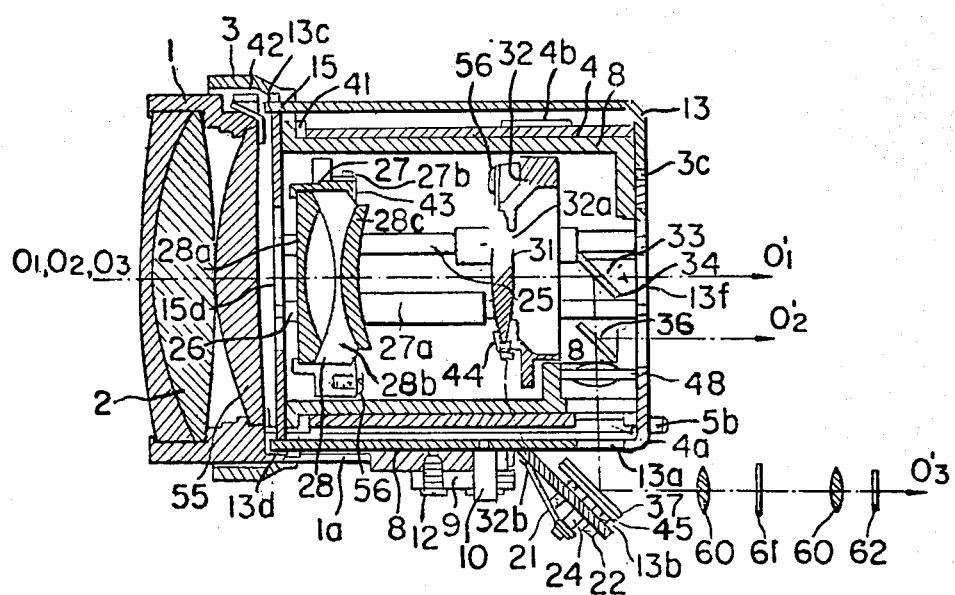
FIG. 3 is a longitudinal section illustrating the essential details of the lens structure according to the present invention.
Figure 4:
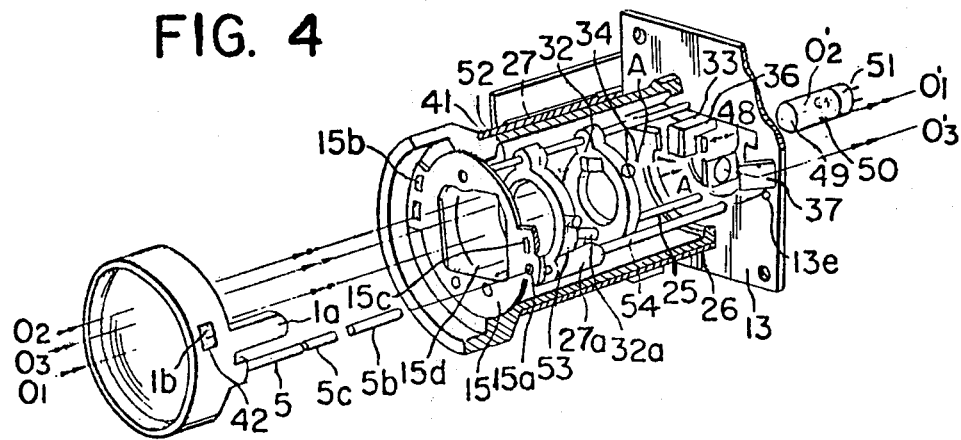
FIG. 4 is a perspective view of the FIG. 3 zoom lens structure, with the focusing lens casing being separated from the zoom lens casing the interior construction of the lens structure.

In FIGS. 3 to 7, frame members 15 and 13 are formed with apertures 15d and 13f for passing therethrough an object light beam 01—01', and are disposed so that they may be exactly positioned relative to a cylinder 3 by means of positioning pin designated as at 3c (see FIGS. 3 to 4). Further, the frame member 13 has a portion corresponding to a slit 15c formed in the frame member 15, which portion provides an extension configured to have an end portion 13d and a tapered portion 13g as shown in FIG. 6B. Thus, the frame member 13, cylinder 3 and frame member 15 can be very accurately connected together simply by inserting the end portion 13d into the hole 15c in the frame member 15, stacking the members 13, 3 and 15 one within another, and thereafter twisting the portions 13c and 13d in the direction of arrows as indicated in FIG. 6A to thereby plastically deform these portions. FIG. 6B is a sectional view taken along line B—B of the FIG. 6A.

In FIGS. 3 and 4, a block 33 having partial reflection mirrors 34 and 36 attached thereto is secured to the frame member 13. If the block 33 and the frame member 13 are formed integrally with each other by molding, the mirrors 34 and 36 may be readily mounted in place with respect to the frame member. The upper half of the mirror 34 and the other mirror 36 lie in the metering optical path so that the light beam passed through the focusing and zooming optical systems may travel along the metering optical path 02—02' which passes through the point of refraction A in mirror 34, the point of refraction B in mirror 36, the rear aperture 13f and condenser lens 49 to a light receiving element 51 within a holder casing 50. The lower half of the mirror 34 and a mirror 37 lie in the viewfinder's optical path, and the point of refraction A' in mirror 34, viewfinder's optical path aperture 4c, the point of refraction C in mirror 37 and a lens 60 together form the viewfinder's optical path 03—03' which will later be described. The mirror 37 is mounted on a mirror mounting plate 45 attached to a support plate 13b formed integrally with the frame member 13. The mounting plate 45 is adjustably attached to the support plate 13b by means of shaft 24, adjust screws 22 and spring member 21 for urging the mirror mounting plate 45 against the adjust screws 22.

A zooming operation ring or cam ring 4 (FIGS. 3 and 5) is rotatably fitted on the cylinder 3 and any axial backlash of this ring may be absorbed by an annular corrugated spring 41 interposed between the frame member 15 and the cam ring 4 to urge the cam ring 4 against the opposite surface of the frame member 13. As shown in FIGS. 4 and 5, there is provided on the outer periphery of the cam ring 4 a plate cam 47 formed with two cam grooves 47a, 47b engaged by pins 53, 54 secured to the holder frames 27 and 32 to drive the magnifying and correcting lenses 28, 31 axially thereof with the rotation of the cam ring 4. Also provided on the outer periphery of the cam ring 4 is a gear portion 4b for permitting the cam ring 4 to be driven by a motor. As shown in FIG. 3, the cylinder 3 and cam ring 4 are cut away at 3d and 4c, respectively, to provide openings so as not to obstruct the viewfinder's optical path 03—03'. Thus, the magnifying and correcting systems 28 and 31 may be driven by a drive motor from the TELE side toward the WIDE side or vice versa, in accordance with a predetermined zoom ratio.

In FIGS. 3 to 7, a guide member 5 is formed integrally with the focusing system holder member 1 to guide axial movement of this holder member, and includes an intermediate fixed portion 5c and an end portion 5b. The guide member 5 permits the holder member 1 to axially move through opposed openings 15a and 13e formed in the frame members 15 and 13, respectively. Since the frame members 13 and 15 also hold the guide members 25, 26 and 52 for the magnifying and correcting systems, the openings 15a, 3e and the guide member mounting opening 15c may be formed simultaneously in the respective frame members without any machining error being caused. Such frame members 13 and 15, through the fitting and fixing procedures described already, can maintain the relative position of the focusing, magnifying and correcting lens units to the optical axis at a very high accuracy. Such an assembly as incorporated in a zoom lens structure is shown in FIG. 7, where a spring 6 is disposed between the frame member 15 and a clamping washer 7 secured to a groove 5c formed in the guide member 5 to normally bias the holder frame 1 rightwardly as viewed in FIG. 7.

With reference to FIG. 7, the focusing mechanism according to the present invention will be described hereunder. A rotary member 9 is rotatable about a pivot 10 studded in the frame member 13 and is operable exteriorly of the camera Ca. The angle of rotation of the rotary member 9 is limited by a stop pin 14 studded in the frame member 13. A cam 8 has such a curvature that the radius thereof is varying with the angle, and the projection 1a of the focusing system holder frame 1 is normally urged against the camming surface of the cam 8 by coil spring 6.

As by manually rotating a focusing knob (not shown) on one side of the camera body, the rotary member 9 and the cam 8 integrally connected thereto may be rotated to cause the projected member 1a to displace the focusing system holder frame 1 by a distance equal to the amount of lift corresponding to the angle of the rotation of the rotary member or of the cam. The end portion 5b of the guide shaft 5 integral with the holder frame 1 is normally projected rearwardly of the frame member 13 (see FIG. 3) to transmit the focusing operation signal of the focusing system to the exterior of the camera.

Further details and adjustment of the focusing mechanism so constructed will be described hereinafter in conjunction with FIG. 8.

The focus cam 8 is connected to the focus stopper or rotary member 9 by means of a screw 12 passed through a threaded hole 8b in the cam 8 and received in a slot 9b in the rotary member 9.

Figure 8A:
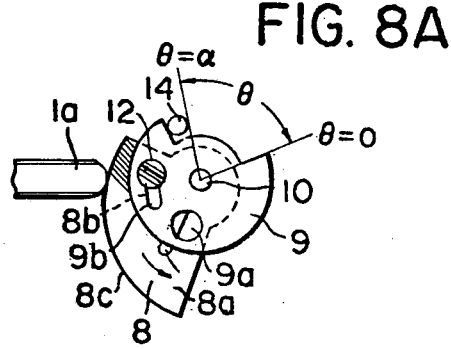
FIG. 8A to 8F are front views showing various modifications of the focusing lens drive mechanism in the zoom lens structure of FIG. 3.
Figure 8E:
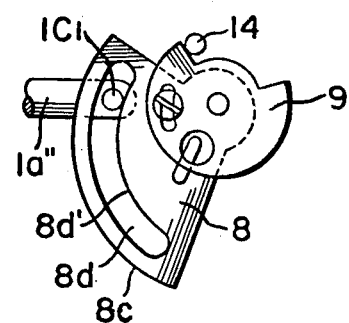
Figure 8B:
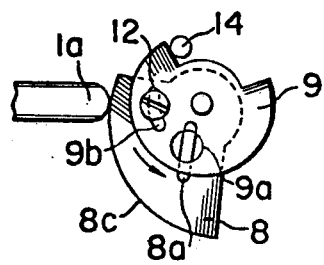

At the stage of the connection accomplished by the use of the screw, the relative position of the slot 9b and the screw 12 may be varied to thereby adjust the reference position of the camming surface 8c relative to the rotary member 9, as from the position of FIG. 8A to the position of FIG. 8B. Also, after the focus cam 8 and rotary member 9 have been connected together for rotation, they may be rotated relative to each other to vary their relative position from that of FIG. 8B to that of FIG. 8C, to thereby adjust the amount of lift for a given focus angle $\theta = \alpha°$. In this case, as shown in FIGS. 8A to 8C, the stopper or rotary member 9 may be formed with a lift adjusting guide opening 9a and the cam 8 may be formed with a tool guide slot 8a. By using a tool having an eccentric pin 56a at the tip end thereof and a body portion 56b of a diameter suitable to fit the opening 9a in the rotary member 9, as shown in FIG. 8G, the adjustment of the refrence position of the cam 8 and of the amount of lift, i.e. the adjustment of the focusing lens and of the amount of its axial movement may be accomplished quite simply and quickly. After the adjustment has been completed, the cam 8 and the stopper or rotary member 9 must of course by perfectly secured to each other as by means of adhesive. Thus, once the adjustment has been done after the assemblage, the focus cam 8 is rotatable with the rotary member 9 so that an amount of lift in accordance with the camming surface 8c formed in an Archimediam curve is imparted to the focusing lens via the projected member 1a of the focusing system holder member 1, thus accomplishing the focusing. It is apparent that the amount of rotation of the rotary member 9 and of the focus cam 8 is limited and determined by the stop pin 14 provided on the camera body. An exteriorly operable member such as focusing knob provided with an indicium corresponding to such amount of rotation may be mounted on a shaft 10 carrying those rotatable members such as focus cam 8 and rotary member 9, so that the knob may be manually rotated to impart a predetermined angular rotation to the focus cam.

Figure 8F:
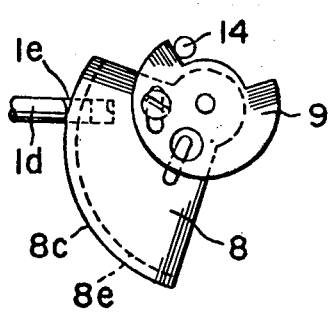
Figure 8C:
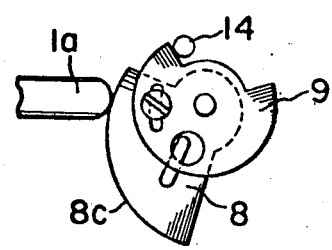
Figure 8G:
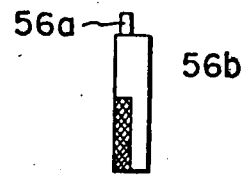
FIG. 8G is a front view of an adjuster used for the adjustment of the focusing lens drive mechanism.
Figure 8D:
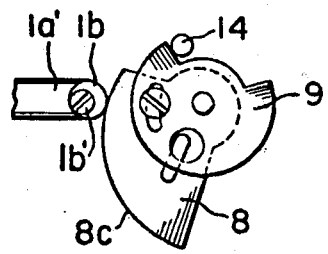

FIGS. 8D to 8F show various modifictions of the above-described focusing mechanism.

In FIG. 8D, the end of the projected member 1a' of the focusing system holder member 1, i.e. that end portion which is engageable with the focus cam 8, is provided with an eccentric pin 1b adjustably rotatable on a shaft 1b' studded in the projected member 1a', so that it is possible to adjust the amount of lift of the projected member 1a' by suitably adjusting the point of contact between the pin 1b and the camming surface 8c of the cam 8. In this arrangement, it is of course possible to form the focus cam 8 and the rotary member 9 integrally with each other.

FIG. 8E shows an embodiment of the focusing mechanism in which a pin $1c_1$ is studded at the end of the projected member 1a'' of the focusing lens holder frame 1 and a camming groove 8d engageable with the pin $1c_1$ is formed in an Archimedian circular form in the focus cam 8 as shown, so that rotation of the focus cam may impart an amount of lift, which results from such rotation, to the lens holder frame 1 via the projected member 1a''. Again in this case, the pin $1c_1$ may be an eccentric pin, which may be adjusted so as to engage the wall surface $8d_1$ of the cam groove 8d to thereby adjust the amount of lift of the lens holder frame 1.

FIG. 8F shows a further embodiment of the focusing mechanism in which a groove 1e is formed in a portion of the projection 1d of the lens holder frame 1 and as indicated by broken line, a stepped portion 8e engageable with the groove 1e is formed in the camming surface 8c of the focus cam 8. As by rotating an exteriorly operably knob provided on the camera body, the focus cam 8 may be rotated to impart an amount of lift corresponding to the angular rotation of the cam to the lens holder frame 1 via the projection 1d.

The focusing mechanism of the present invention has been described above as being incorporated in a zoom lens structure, but such focusing mechanism can equally be incorporated in ordinary lens structures, although not shown and described.

As mentioned previously, the present invention also provides an embodiment of the zoom lens structure which enables super-closeups to be achieved, and a specific sequence of operations therefor will now be described.

In FIG. 7, a slidable rod 16 formed with slots 16b and 16c guided by pins 17 and 20 studded in the frame member 13 is biased in the direction for engagement with a projection 4a by the action of a coil spring 18 secured to and extended between a pin 17 and a spring retaining pin 19 studded in the slidable rod 16. From the WIDE stop position provided by the engagement between the end portion 16a of the slidable rod 16 and the projection 4a, the slidable rod 16 is slidden rightwardly, as viewed in FIG. 7, out of engagement with the projection 4a against the force of the spring 18, whereafter the cam ring 4 is rotated from the WIDE focus stop position to the super-closeup focus stop position to drive the correcting system rearwardly and thereby enable a super-closeup to be achieved without displacing the magnifying system.

Such change-over from an ordinary photographing mode to a super-closeup mode can be mechanically and simply accomplished by gripping the slidable rod 16 at the end 16d thereof, withdrawing the rod 16 and actuating a change-over lever or the like provided exteriorly of a cinecamera or other motion picture camera which incorporates the lens structure of the present invention. The cam ring 4 is provided with the aforesaid cut-away portion 4c so as not to obstruct the viewfinder's optical path 03—03' in any of the TELE stop position, the WIDE stop position and the super-closeup stop position. Within the range of rotation of the cam ring 4 from the WIDE stop position provided by the rotation of the cam ring 4 following the disengagement between the projection 4a on the cam ring 4 and the slidable rod 16 to the super-closeup stop position, a colored filter or the like (FIG. 5) may be inserted in the viewfinder's optical path 03—03', whereby the super-closeup condition provided by displacing at least one of the magnifying system and the correcting system can be indicated within the viewfinder. Furthermore, it is apparent that the viewfinder aperture construction of the present invention readily enables the information such as variation in image magnifying power or amount of rotation of the zoom ring up to the high zooming rate to be indicated in the viewfinder's optical path 03—03' in accordance, usually, with a predetermined zoom ratio of the cinecamera or the like.

FIG. 9 shows, in perspective view, an embodiment of the lens unit applicable to the zoom lens structure of the present invention. Especially, to illustrate the sequence of procedures for assembling a lens to the unit, this figure shows the lens and lens pressing resilient member individually, in addition to the assembled lens unit. As shown, the lens holder frame 1, which has already been described, has an opening $1_1$ for receiving the lens 55 therein, and the frame 1 is shown with such lens 55 already received in the opening $1_1$ and fixed by the lens pressing resilient member 42 which will be described further. The lens holder frame is depicted especially to show the focusing lens unit for a zoom lens structure, and in this connection, there are also shown mounting elements required for the lens structure such as member 1a operatively associated with the above-described focusing mechanism of a cinecamera or the like, and guide member 1c cooperable with the frame member of the lens structure to guide the holder frame 1 along the optical axis. Guide shaft 5 is integral with the lens holder frame 1 and may be inserted into a mating hole formed in the lens structure to which the focusing lens unit is to be mounted, thereby limiting the forward and backward movement of the lens holder frame 1 within a predetermined tolerance with respect to the optical axis. The rear end portion 5b of the guide shaft 5 serves to provide the camera body with a signal respresenting the movement of the lens holder frame toward the optical axis, as will be described hereinafter. The guide shaft 5 also has a washer fixing groove 5c for holding the intermediate portion thereof. The lens holder frame 1 has preferably a plurality of crank-like openings 1b formed therethrough as shown, which openings 1b serve as lens fixing retainer portions. Member 42 is resiliently deformable and has lens fixing retainer means 42a corresponding in number to the lens fixing retainer portions 1b formed in the lens holder frame 1. As shown, each of the lens fixing retainer means 42a is substantially of L-shaped section having an obtuse angle between the bent portions 42a' and 42a''. The retainer means 42a of such shape may be received in the respective openings 1b of the lens holder frame 1 having the lens 55 mounted therein, to thereby hold the lens 55 fixedly. This is because when the resilient member 42 is attached to the lens holder frame 1, the obtuse-angled portions of the retainer means 42a are deflected into engagement with the peripheral surface of the lens to fix the lens immovably within the holder frame due to such resilient deformation.

FIG. 10 is a perspective view of another embodiment of the lens unit according to the present invention and for the purpose of clarity, it additionally shows a lens and a lens pressing resilient member separately from the assembled unit. This lens unit is again shown to be applicable to a zoom lens structure, and may be a correcting lens unit to which reference was already had. The holder frame 32 for the lens 31 has a guide member 32a adapted to engage the previously described guide member to move the lens unit. The holder frame further has a lens fixing retainer portion 32b which may be in the form of a projection, as shown. A lens pressing resilient member 44 has a lens fixing retainer means 44a engageable with the retainer portion 32b of the lens holder frame 32. The resilient member 44 has another retainer means 44b for passing a screw therethrough. FIGS. 11A, B and C show such lens pressing resilient member in front view, side view and plan view, respectively. As best shown in the side view of FIG. 11B, the resilient member is formed in a dog-legged sectional shape, bent at intermediate points 44c. Such resilient member 44 may be fixed to the lens holder frame having the lens 31 inserted therein, in the manner as described just below. First, the retainer means 44a is received and retained in the retainer portion 32b, whereafter the other retainer means 44b is urged in the same direction as the lens inserting direction, and then a screw 56 is inserted into the holder frame 32 through the opening in the retainer means 44b. Thus, the lens 31 within the holder frame has a peripheral portion thereof pressed by the bend portions 44c of the resilient member 44, so that the entire lens is urged and fixed against the lens holder frame.

With reference to FIGS. 12 to 16, description will now be made of an arrangement and operation for detecting the axial movement of the guide member for the focusing system provided in the zoom lens structure and for indicating such detection within the viewfinder's field of an optical instrument.

Figure 13:
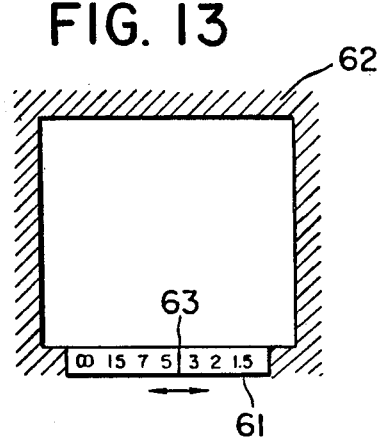
FIG. 13 shows the range information imparting member as it appears in the viewfinder field.

FIG. 12A is a fragmentary detailed view of the rear end and side portion of the zoom lens structure shown in FIG. 3. Although described already, the viewfinder's optical path 03—03' will further be considered. A viewfinder's optical system 60 forms a part of the optical path which follows the point of refraction c, and a range index member 61 is inserted in the optical system 60 and located substantially at an image forming plane in the viewfinder's optical path. A viewfinder mask 62 is disposed as shown. In the rear portion 5b of the guide member 5 responsive to the axial movement of the focusing system, a member 63 is provided to impart range information so as to appear in another image forming plane in the viewfinder's optical path. As shown to an enlarged scale in FIG. 12B, the member 63 is movable in the direction of double-headed arrow in response to the axial movement of the focusing system or to the movement of the guide member 5, and the amount of such movement together with the range index member 61 may be indicated in the viewfinder's field through the viewfinder mask 62, as shown in FIG. 13. Therefore, by adjusting the scale of the range index member 61 and the amount of movement of the range information imparting member 63, the distance to an object to be photographed can be indicated in the viewfinder's field in the manner as shown in FIG. 13. The use of a color such as red for the range information imparting member 63 will be more effective.

Figure 14A:
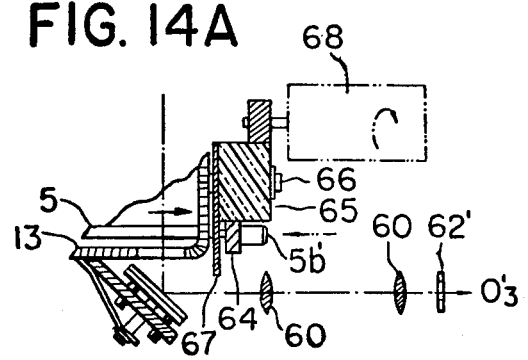
FIGS. 14A and 14B show a modification of the FIG. 12A arrangement, and particularly the position of the guide member for a short object distance and that for a long object distance, respectively.
Figure 14B:
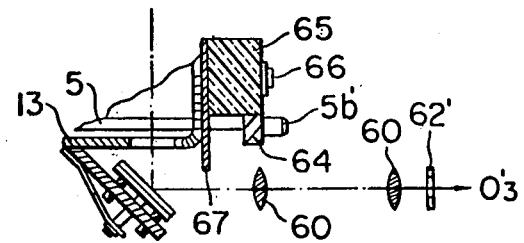
Figure 15A:
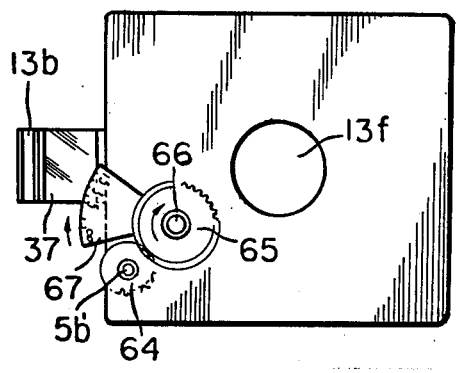
FIGS. 15A and 15B are side views taken from the right-hand side of FIGS. 14A and 14B, respectively.
Figure 16A:
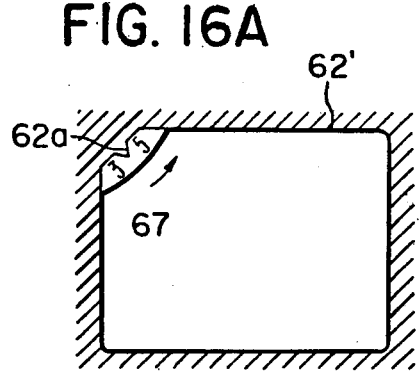
FIGS. 16A and 16B show the viewfinder field in the two different cases of FIGS. 14A and 14B.
Figure 15B:
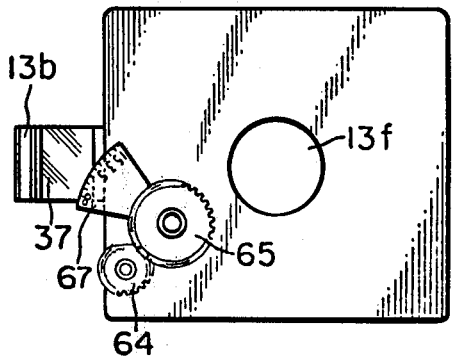
Figure 16B:
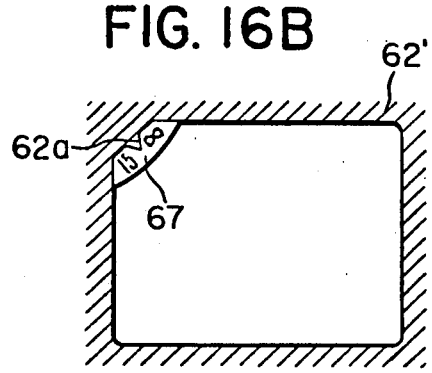

FIGS. 14A and B to FIGS. 16A and B illustrate another arrangement alternative to the arrangement of FIG. 12. This alternative employs, in the rear portion 5b of the focusing system guide member 5 in the lens structure of FIG. 3, a system whereby the rectilinear movement, of such member is converted into a rotational movement whose amount is adjusted to the scale of the range index member. A specific construction of such system will now be described in conjunction with FIGS. 14 and 15.

Referring to FIGS. 14A and B to FIGS. 15A and B, a smaller helical gear 64 is mounted on the rear end portion of the axial guide member 5 for the focusing system, and has an integral mating portion 5b'. A larger helical gear 65 is rotatably mounted on a shaft 66 supported by unshown camera body, and it is in meshing engagement with the smaller helical gear 64. By these two helical gears 64 and 65, an amount of rectilinear movement of the guide member 5 responsive to the focusing system may be converted into an amount of rotational movement. The larger helical gear 65 has a range information imparting member 67 integrally attached thereto. The member 67 has a range inex provided on a peripheral portion thereof.

Further, as shown in FIGS. 16A and B, the viewfinder mask 62' is designed such that the range index portion of the member 67 appears in the upper left corner of the viewfinder mask 62' inserted in the viewfinder's optical path 03—03', and the viewfinder's mask 62' is provided with a needle-like portion 62c for pointing to the index.

Thus, the distance to an object to be photographed may be always indicated within the viewfinder. In FIG. 15, the character 13f designates an aperture formed through the frame member 13 for passing therethrough an object light beam.

In brief, where an object at a long distance is to be photographed from a position for photographing an object at a short distance, the focusing system may be retracted toward the camera body along the optical axis, as shown in FIG. 14 to FIG. 16A. This causes the guide member 5 associated with the focusing system to be retracted in the direction of arrow indicated in FIG. 14A until it reaches the position as shown in FIG. 14B. In response to such axial movement, the two helical gears are rotated. As shown in FIG. 15A, the larger helical gear 65 is rotated clockwisely by an amount determined by the number of its teeth in accordance with the amount of movement of the guide member 5. Simultaneously therewith, the range information imparting member 67 is also rotated to the position of FIG. 15B. At this point, the range indication in the viewfinder shifts from the condition shown in FIG. 16A to the condition shown in FIG. 16B.

The device of the present invention for indicating the range information in the viewfinder is apparently applicable not only to the above-described zoom lens structure of cinecamera but also to other optical instruments. Also, in the second embodiment of the type wherein the rectilinear movement of the focusing system guide member 5 is converted into rotation movement by a gearing, it is possible to operatively connect the gearing to an electric motor 68, as shown by dots-and-dash lines in FIG. 14A, so that the guide member 5 may be moved in the direction of the straight dotted arrow when the motor is revolved in the direction of curved dotted arrow.

Thus, according to the present invention, the fitting portions between the magnifying system holder frame and the guide member of the correcting system holder frame can be longer than in the lens structure of the prior art as shown in FIG. 1, and this correspondingly enhances the accuracy with which the lenses are held with respect to be optical axis, thus preventing the lenses from inclining with respect to the optical axis and accordingly improving the accuracy of image formation. A further advantage of the present invention is that a beam splitter incorporated in the zoom lens structure and an aperture formed in the side wall of the lens structure for passage of a viewfinder light beam enable the indication of the photographic information to be simply achieved. Furthermore, the lens structure of the present invention permits not only the conventional zooming shots but also super-closeups and also enables the information about the change-over between these different modes to be indicated in the viewfinder, and this means a great convenience to the user of cinecameras having such a lens structure incorporated therein. In addition, the focusing mechanism mounted in the zoom lens structure of the present invention has the following advantages resulting from the above-described construction thereof.

1. As compared with the conventional helicoid system, the present focusing mechanism does not require the procedure of threading and can eliminate the complicated adjusting operation by using set screws or the like, thus providing a camera with a focusing mechanism at a lower cost.

2. Adjustment can be made of the amount of lift of the lens holder frame responsive to the rotational movement of an exteriorly operable member such as knob or the like provided on a camera body, whereby any irregularity present in the finish precision of the lens elements in the lens structure can be well absorbed.

3. By suitably changing the camming surface configuration of the focus cam with respect to the angle of rotation of the focusing operation member operable exteriorly of the camera body, the intervals between the focusing range scale divisions may be suitably selected. With the conventional helicoid system, the intervals between such scale divisions were gradually smaller with the distance and this was very inconvenient to the user in rotating the lens casing from closeup position toward a long-distance position. According to the present invention, equally spaced divisions may be used on the exterior operating member.

4. A focusing operation member such as knob for rotating the focus cam may be provided on a side of the camera body and this greatly facilitates the focusing operation and provides much convenience to the user of the camera.

It will be apparent that the lens units used with the zoom lens structure of the present invention are not limited in use to the zoom lens structure of cinecamera or the like but are also applicable to other lens structures.

As will be appreciated, the present invention can provide a lens unit assembled by a simple method using no conventional lens fixing method, and thus can greatly reduce the cost incurred. Further, where a composite lens consists of lens elements in marginal contact, such lens may be immune from damages because the lens can be mounted in place by the deflection of the resilient member. Especially, once the lens is firmly fitted within its holder frame, the spring force of the resilient member acts to urge and fix the lens against the holder frame. This is suitable to fix lenses of smaller mass.

Still furthermore, in the zoom lens structure of the present invention, the movement of the member guiding and movable in response to the axial movement of the focusing system may be detected and such detection may be positively utilized as range information and indicated in the viewfinder's field, and this is highly effective in a camera of the type which employs such focusing system guide member.

For an automatic focusing operation, the optical means in the focusing system may conveniently be driven from an electric motor through a member operatively associated with the focusing system.

We claim:

1. In an optical instrument with an optical lens unit having a multi-component lens and having also a viewfinder for viewing through said lens of said lens unit, the combination comprising:

separate zooming optical means and focusing optical means independently movable along a common optical axis;

means for guiding said zooming optical means for movement along said optical axis, said guiding means having at least one elongated number parallel to said optical axis;

first carrier means for carrying said zooming optical means movably along said optical axis, said carrying means having a mating portion movably mounted on said elongated member of the guiding means;

a second carrier means for carrying said focusing optical means;

a casing for holding said zooming optical means having a cylinder portion extending in the direction of said optical axis for surrounding said optical means over the range of the axial movement thereof and frame portions provided at the ends of said cylinder portion for fixing said elongated member at both ends thereof, said frame portions having respective openings wherever said optical axis passes therethrough;

beam splitter means for splitting a light beam which has passed through said optical means into a principal light beam and viewfinder light beam, said splitter means being disposed in the casing between said optical means and the one of the frame portions of the casing which is the more remote from an object to be optically observed;

first operating means for moving said first carrier means, and second operating means for moving said second carrier means independently of said zooming optical means, said second operating means including rotatable means having a camming surface normally engaged with said second carrier means and including means for variably adjusting the amount of lift of said camming surface from its center of rotation;

said cylinder portion of the casing having an opening disposed where said viewfinder light beam derived from said beam splitter means passes therethrough to the exterior of the casing, said elongated member of the guiding means having an extended portion along said optical axis passing abreast of a portion of said beam splitter means and the mating length of said mating portion of said first carrier means, being of such length as to take some advantage of the additional length of said guiding means provided by said extended portion.

2. In an optical instrument with an optical lens unit having a multi-component lens and having also a viewfinder for viewing through said lens of said lens unit, the combination comprising:

separate zooming optical means and focusing optical means independently movable along a common optical axis;

means for guiding said zooming optical means for movement along said optical axis, said guiding means having at least one elongated member parallel to said optical axis;

first carrier means for carrying said zooming optical means movably along said optical axis, said carrying means having a mating portion movably mounted on said elongated member of the guiding means.

second carrier means for carrying said focusing optical means, a casing for holding said zooming optical means having a cylinder portion extending in the direction of said optical axis for surrounding said optical means over the range of the axial movement thereof and frame portions provided at the ends of said cylinder portion for fixing said elongated member at both ends thereof, said frame portions having respective openings wherever said optical axis passes therethrough;

beam splitter means for splitting a light beam which has passed through said optical means into a principal light beam and a viewfinder light beam, said splitter means being disposed in the casing between said optical means and the one of the frame portions of the casing which is the more remote from an object to be optically observed;

first operating means for moving said first carrier means, and second operating means for moving said second carrier means independently of said zooming optical means;

said second operating means including:

a rotary member mounted on said optical lens unit, and a cam member connected to said rotary member and having a camming surface whose amount of lift from the center of said rotary member is continuously variable, said camming surface of said cam member being engaged with said second carrier means to thereby displace said second carrier means along said optical axis in accordance with the configuration of said cam;

said cylinder portion of the casing having an opening disposed where said viewfinder light beam derived from said beam splitter means passes therethrough to the exterior of the casing, said elongated member of the guiding means having an extended portion along said optical axis passing abreast of a portion of said beam splitter means and the mating length of said mating portion of said first carrier means, being of such length as to take some advantage of the additional length of said guiding means provided by said extended portion.

3. In an optical instrument with an optical lens unit having a multi-component lens and having also a viewfinder for viewing through said lens of said lens unit, the combination comprising:

optical means for varying at least one characteristic of said lens movable along the optical axis thereof;

means for guiding said optical means for movement along said optical axis, said guiding means having at least one elongated member parallel to said optical axis;

means for carrying said optical means movably along said optical axis, said carrying means having a mating portion movably mounted on said elongated member of the guiding means;

a casing for holding said optical means having a cylinder portion extending in the direction of said optical axis for surrounding said optical means over the range of the axial movement thereof and surrounding said guiding means and frame portions provided at the ends of said cylinder portion for fixing said elongated member at both ends thereof, said frame portions having respective openings wherever said optical axis passes therethrough;

beam splitter means for splitting a light beam which has passed through said optical means into a principal light beam and a viewfinder light beam, said splitter means being disposed in the casing between said optical means and the one of the frame portions of the casing which is the more remote from an object to be optically observed; and operating means for moving said optical means carrier means;

said cylinder portion of the casing having an opening disposed where said viewfinder light beam derived from said beam splitter means passes therethrough to the exterior of the casing, said elongated member of the guiding means having an extended portion along said optical axis passing abreast of at least a portion of said beam splitter means so as to accommodate an enlarged mating length of said mating portion of the carrier means, said mating portion having a length in the direction of said axis substantially equivalent to the interior length of said casing less the length required for the scope of movement of said optical means, so that part of said mating portion passes abreast of a portion of said beam splitter means for at least some of the usable positions of said optical means.

4. A combination in an optical instrument according to claim 3, wherein:

said optical means comprises separate variating optical means and compensating optical means independently movable along said optical axis, and said optical means carrying means comprises separate carrier means, said mating portion comprises separate segments mating said guiding means for said variating optical means and said compensating optical means respectively, said separate carrier means being independently movable along said optical axis, each being operatively associated with said guiding means the total collinear length of said respective mating segments being substantially equivalent to the interior length in said casing, including the portion also utilized by said beam splitter means, less the aggregate length required for the respective scopes of movement of said variating and compensating optical means, and at least one of said carrier means having a mating segment lengthened so as to pass abreast of said beam splitter means in at least some of the usable positions of said one of said carrier means.

5. A combination in an optical instrument according to claim 3, further comprising photographic information indicator means supported by said casing so as to display information in said viewfinder light beam passage opening in said casing to thereby impart within the field of said viewfinder the information representing the photographic condition corresponding to the movement of at least one of said variating optical means and said compensating optical means.

6. A combination in an optical instrument according to claim 4, wherein said casing includes indicator means for indicating a super-closeup condition, said indicator means being supported by said casing so as to appear in said viewfinder light beam passage opening in said frame member, said indicator means being capable of appearing in the field of said viewfinder when said compensating optical means has shifted from an ordinary photographic mode to a super-closeup mode.

7. A combination in an optical instrument according to claim 6, wherein said indicator means includes a colored filter capable of appearing in the field of said viewfinder.

8. A combination in an optical instrument according to claim 3, wherein:

said optical means comprises zooming optical means and and said optical instrument further includes focusing optical means independently movable along said optical axis;

said optical means carrying means comprises a first carrier means for carrying said zooming optical means and said optical instrument further includes a second carrier means for carrying said focusing optical means, and said optical instrument further includes a second operating means for moving said second carrier means independently of said zooming optical means.

9. A combination in an optical instrument according to claim 8, wherein said second operating means includes rotatably means having a camming surface normally engaged with said second carrier means.

10. A combination in an optical instrument according to claim 9, wherein said second carrier means further includes adjustable means provided in a portion thereof to variably adjust the position of engagement between said second carrier means and said camming surface.

11. A combination in an optical instrument according to claim 8, wherein said second carrier means includes means for imparting the range information corresponding to the amount of displacement of said focusing optical means along said optical axis.

12. A combination in an optical instrument according to claim 11, wherein said information imparting means includes an information imparting member capable of appearing in the vicinity of a focal plane in said viewfinder optical path provided by said viewfinder light beam.

13. A combination in an optical instrument according to claim 8, wherein said focusing optical means includes a lens element and said second carrier means includes:

a lens holder frame having an opening for receiving said lens element therein and a retaining portion for fixing said lens element; and a resilient member having a retainer means engageable with said retaining portion of said lens holder frame to normally urge a peripheral portion of said lens element in the lens inserting direction once said lens element is inserted in said lens holder frame.

14. A combination in an optical instrument according to claim 8, wherein said zooming optical means includes a lens element and said first carrier means includes:

a lens holder frame having an opening for receiving said lens element herein and a retaining portion for fixing said lens element; and a resilient member having a retainer means engageable with said retaining portion of said lens holder frame to normally urge a peripheral portion of said lens element in the lens inserting direction once said element is inserted in said lens holder frame.

* * * * *